United States Patent [19]

Falk

[11] Patent Number: 4,674,703

[45] Date of Patent: Jun. 23, 1987

[54] TEMPERATURE COMPENSATING CLOSURE FOR CARTRIDGES

[75] Inventor: Mervin L. Falk, Sunnyvale, Calif.

[73] Assignee: Cartrex, Grand Rapids, Mich.

[21] Appl. No.: 859,633

[22] Filed: May 5, 1986

[51] Int. Cl.[4] .......................... F16B 19/10; G03B 1/04
[52] U.S. Cl. .................................... 242/199; 242/192;
24/625; 360/132
[58] Field of Search ........................ 242/192, 197–200,
242/188; 24/625, 629, 615, 588, 292, 295, 297,
604, 610; 360/71, 73, 93, 96.3, 96.1, 132

[56] References Cited

U.S. PATENT DOCUMENTS

| | | | |
|---|---|---|---|
| 3,493,990 | 2/1970 | Winn | 24/625 X |
| 4,095,758 | 1/1978 | Shroff | 242/199 X |
| 4,172,569 | 10/1930 | Newell | 242/192 |
| 4,380,032 | 4/1983 | Pfost | 360/74.6 |
| 4,457,473 | 7/1984 | Mroz et al. | 242/192 |
| 4,466,585 | 8/1984 | Maehara | 242/199 |
| 4,571,647 | 2/1986 | Tanaka et al. | 360/96.1 |
| 4,571,789 | 2/1986 | Morioka | 24/625 |

Primary Examiner—Donald Watkins

[57] ABSTRACT

A cartridge cover having slotted bosses which are positioned so that both the bosses and their slots are aligned with the vectorial resultant lines representing the direction of change that takes place during thermal expansion of the cartridge. Each boss has a fitting which engages pins fixed into the base of the cartridge, thereby securing the cover to the base. The cover and the base have different coefficients of thermal expansion. The slots are of sufficient length to allow all motion of the pins, taking place as a result of thermal expansion, to occur within the slots.

10 Claims, 3 Drawing Figures

TEMPERATURE COMPENSATING CLOSURE FOR CARTRIDGES

TECHNICAL FIELD

The invention relates to a temperature compensating closure for containers such as cartridges for tape or film reels.

BACKGROUND ART

For purposes of this application, magnetic or other tape rolls and reels, film on reels, printing ribbons on spools and other flat, rolled strips of material are all referred to as "tape".

The typical tape cartridge housing is a boxlike container having a bottom half—a base—constructed of metal. For example, U.S. Pat. Nos. 4,172,569 to Newell and 4,380,032 to Pfost show a metal base plate onto which the vast majority of inner workings are attached. The base plate is machine cut to the desired size and shape. Dimensionally the cartridge conforms to ANSI (Americal National Standard Institute) standard number X3B1/625. A number of stationary tape guide members and a greater number of pins are then pressed into the plate. The pins are used for a variety of purposes, the most important of which are to hold the tape wound supply and take-up hubs and to retain the drive belt guide members at fixed locations.

The base plate is then made of metal for reasons of durability and stability. Durability of the plate is a major concern because of the constant pressure on the pins as the tape hubs and guide members rotate upon them. It is well known in the tape recording art that a myriad of problems will occur if the tape is not wound upon the hubs in uniform tension or if pins, guides or rotating members are not maintained in suitable alignment. For example, if a tape supply hub contains a high tension point somewhere on the supply of tape, relaxation takes place when that point is exposed during playback. This causes the tape undergoing relaxation to become somewhat shorter and somewhat thicker, thereby momentarily slowing the tape's motion across the magnetic head. The result is variously known as time displacement error (TDE), time base error (TBE), jitter, wow, or flutter. To reduce the possibility of such error, it is important that the base plate always retain its shape. Another example is tape misalignment, misregistration, and possible damage that can be caused by thermally induced cartridge component movements. Thus, the plate is typically made of metal.

The top half of the tape cartridge, on the other hand, is made of a less expensive, more easily formed material having a different coefficient of thermal expansion. U.S. Pat. Nos. 4,172,569 and 4,380,032, mentioned above, show the use of a plastic top. Transparent plastic is often a desirable material because it allows an operator to peer into the cartridge if he or she so desires and it permits a manufacturer to make improvements involving optics without changing the design of the cover.

The prior art teaches the use of screws to attach the plastic top to the metal base plate. Since the two materials have different coefficients of thermal expansion, one of the sides will warp, or even buckle, as the cartridge heats during use. If the plastic top buckles, there may be difficulty taking the cartridge out of the tape drive. In addition, warp will distort any optical signals being passed through the plastic top. Finally, the possibility of cover buckle requires the manufacturer to leave larger clearances between the cover and any moving parts within the cartridge. Because the ANSI standard limits the size of the cartridge, the need for minimizing clearances may be critical to developing future cartridge improvements.

Any warping of the plastic cover or the base plate will increase the chances of tension variations or other mishandling as tape winds from one tape hub to the other. As mentioned above, changes in tape tension cause distortion when the tape is played back. Yet, high speed tape movement and mechanical power transferred to the cartridge tend to create heat within the cartridge which is removed by conduction or convection into the cartridge walls with more heat being conducted to the metal base, as a result of the pins being firmly anchored to the base. This unequal transfer of heat as well as the difference in coefficients of thermal expansion, cause the cover dimensions to change by amounts that differ from the base. This thermally induced differential dimension change is the source of the problem described above.

The problem solved by the present invention is similar to the one addressed in U.S. Pat. No. 4,571,789 to Morioka. However, in that patent pins with specially shaped heads in two directions and reduced necks extend from a cartridge top and fit into undercut holes in a cartridge base plate. While the resulting cartridge has merit for overcoming thermal stress in a cartridge, a simpler solution is needed.

An object of this invention is to provide for joining closures and bases having different coefficients of thermal expansion which permits expansion without a warp or buckle to either member.

DISCLOSURE OF INVENTION

The above objective is achieved by permitting different materials in a tape cartridge to expand at their own rates. This is accomplished through the use of slotted bosses which, when engaged to pins embedded into the base plate of the cartridge, hold the cartridge cover to the base plate, while still allowing thermally induced expansions to take place in each.

Thermal expansion may be expressed vectorially. By spatially disposing slotted bosses along the vectorial resultant lines and aligning the slots in agreement with those lines, the present invention compensates for differences between the thermal expansion of the base plate and that of the cover.

An advantage of the use of slotted bosses is that by compensating for differences in heat expansion a myriad of potential problems is avoided. One example of these potential problems is the distortion known as flutter. Another advantage is that, since the concern for warp and buckle is substantially decreased, the clearance between the cover and any moving parts may be minimized. Another advantage is that tape misguiding due to plate and pin relocation is minimized, reducing damage to the delicate tape. Another advantage is that the relationships between the reference points used to locate the cartridge in a drive, and the tape edge are preserved, thus reducing tape location ambiguities when installed in an operating environment. Yet another advantage of this embodiment is that the cover motion is constrained in X, Y and $\theta$ directions. This leaves additional space for future improvements in cartridge construction and operation.

Although it is easier to mount the slotted bosses on the cover and the matching mounting pins on the base plate, there is no reason why this construction cannot be reversed. Requirements in meeting the ANSI standard do not always permit placement of the bosses directly on the vectorial resultant lines discussed above. In the interest of practicality, placement of the bosses in keeping with manufacturing needs may be considered a functional equivalent to optimal positioning of the bosses directly on those vectorial resultant lines associated with the corners of the cartridge.

Another advantage of the present invention is its ease in assembly and disassembly. Instead of using screws to secure the cover to the base plate, the present invention is fitted to allow the two surfaces to be snapped together. The exterior end of the slots has a fitting which slips into a furrow cut into pins located on the base plate.

BEST MODE FOR CARRYING OUT THE INVENTION

Figure 1:
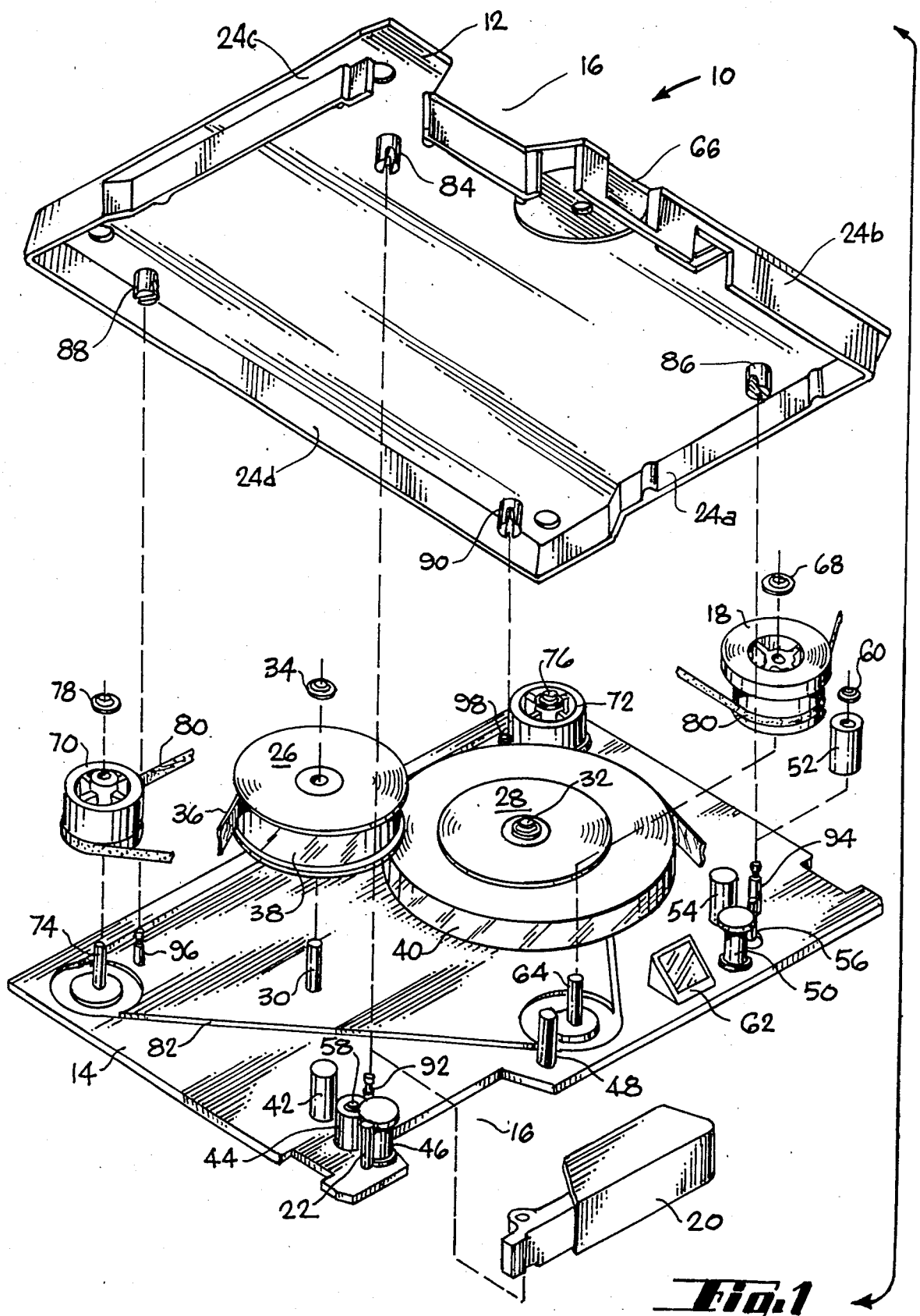
FIG. 1 is a perspective view of a typical tape cartridge for use in conjunction with the present invention.

Referring to the drawings, FIG. 1 shows a sample tape cartridge, such as that described in prior U.S. Pat. No. 4,172,569. However, the invention is not restricted to magnetic tape cartridges. It is applicable to any cartridge, or any application where two members must be attached without thermal interaction.

A short description of a tape cartridge is here given in order to understand the principle behind the present invention. A cassette 10 includes a plastic molded cover 12 and a metal base plate 14. Dimensionally the cassette conforms to the previously mentioned standard ANSI X3B1/625. This standard dictates the general overall dimensions of the cartridge, including the positioning and size of a head aperture or port 16, the position of a rotary drive and belt guide member 18, and the size, shape and position of a tape guard 20, which is mounted for rotation about a pin 22 fixed to the base plate 14 in order to render the cartridge compatible with existing commercially available equipment. The cover has sidewalls 24a, 24b, 24c, and 24d configured to space the base plate 14 from cover 12.

First and second hubs 26, 28 act as the tape supply and take-up hubs and are rotatably mounted with parallel axes of rotation and in a generally coplanar relationship on the base plate 14 by means of a pair of axial shafts 30, 32. The hubs 26, 28 are held onto the shafts 30, 32 by means of a clip 34. A length of magnetic tape 36 is distributed within the cartridge 10, having one end portion or roll 38 wound on the first hub 26 and an opposite end portion or roll 40 wound on the second hub 28. In operation the magnetic tape 36 extends from the first hub 26, around a cylindrical tape guide post 42 and across a tape guide idler 44, from which point the tape 36 makes a bend around a channelled tape guide 46 which positions the tape 36 to make its path across aperture 16. It is held in place across aperture 16 by a second cylindrical tape guide post 48. After the magnetic tape 36 crosses second guide post 48 it follows a path similar to that which it took in arriving at the guide post 48. That is, it loops around a second channelled tape guide 50, a second tape guide idler 52, and a third cylindrical tape guide post 54 to the second hub 28. The channelled tape guides 46, 50 and the cylindrical tape guide posts 42, 48, 54 are nonrotationally fixed to the base plate 14. On the other hand, the tape guide idlers 44, 52 are rotationally mounted onto a pin 56, 58 and secured by a clip 60.

An optical element 62 is mounted onto the base plate 14. This optical element 62 is part of a system which reads information contained on the magnetic tape 36, other than that information which is magnetically encoded. For example, color marks placed on the tape 36 may be used to signal the beginning and the end of a tape.

The drive and belt guide member 18 is rotatably mounted on a shaft 64 to the base plate 14 at a frontal position on the cassette 10 so as to protrude through an opening 66 in the cover 12 for engagement with a drive capstan when the cassette 10 is in operative placement in a record-playback apparatus, not shown. The drive member 18 is held in place by a clip 68.

A pair of similar rotary belt guide members, or idlers, 70, 72 are rotatably mounted on a pair of parallel shafts 74, 76. The idlers 70, 72 are secured by a clip 78. The idlers 70, 72 each have a stepped construction with pulley portions of different radii for affording different mechanical advantages as described in U.S. Pat. No. 4,172,569. A tensioning belt 80 is trained about the rotary drive member 18 and idlers 70, 72. The belt 80 fits within a groove 82 which is cut into base plate 14. An endless loop drive belt, not shown, is trained about the upper portion of the drive member 18 and the idlers 70, 72. The drive belt makes contact with the rolls 38, 40 of tape at the periphery closest to the center of the base plate 14, thereby transferring power from the drive pulley to the tape hubs 26, 28.

It is emphasized that the cartridge description herein is exemplary and other types of containers could employ the features of the present invention. Whatever type of container is used, the present invention calls for the placement of slotted bosses 84, 86, 88, 90 in the cartridge cover 12. A corresponding number of fixed pins 92, 94, 96, 98 are embedded into the base plate 14. The cover 12 can then be secured to the base plate 14 by engaging the bosses 84, 86, 88, 90 with the pins 92, 94, 96, 98.

Figure 2:
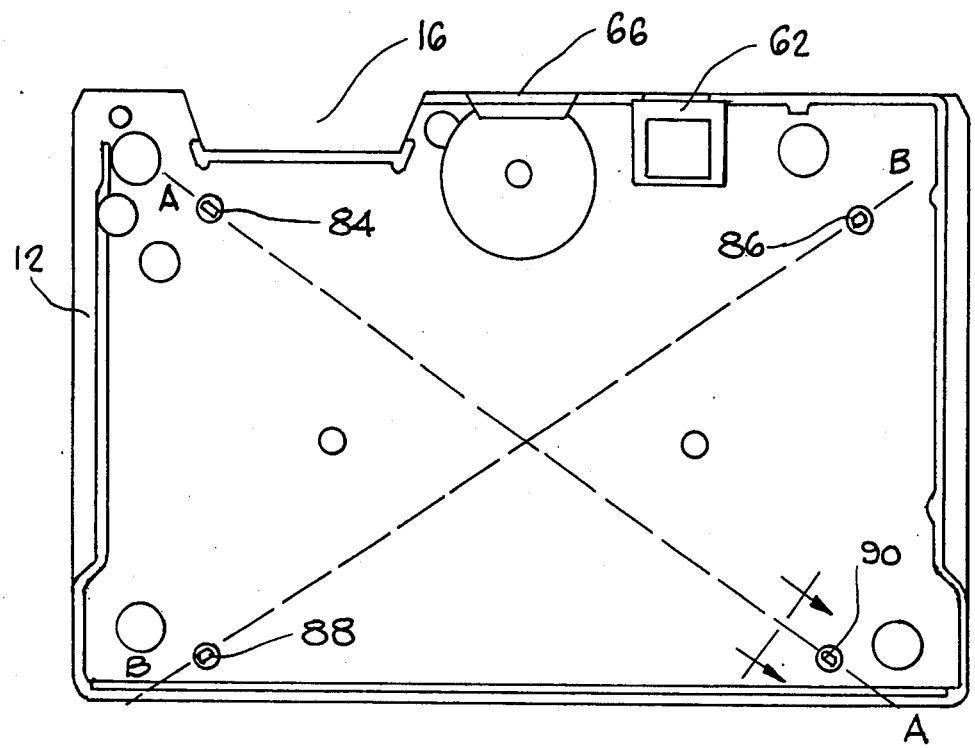
FIG. 2 is an elevational view of the cartridge cover of FIG. 1.

FIG. 2 shows that the bosses 84, 86, 88, 90 are positioned toward the corners of the cover 12. The positioning of bosses is important because thermal expansion is not directionally uniform. Any given point on a cartridge will change in relationship to its position from the exact center of the cartridge while the cartridge is undergoing thermal expansion. This change in position may be represented vectorially. Lines A—A and B—B represent vectorial resultants of the direction of change.

A tape cartridge has a plastic cover 12 and a metal base plate 14. The only requirement for the base plate is that its coefficient of thermal expansion be noticeably different from the cover plate. Metal is not a requirement for the base plate. The base plate 14 will expand much differently than the cover 12. For this reason tape cartridges have had a tradition of problems caused by buckle of the cover or warp of either the cover or the base plate. For example, buckle or warp may cause distortion (e.g. flutter), tape misregistration or damage during playback of the tape, or a buckle may present problems during removal of the cartridge from a record-playback apparatus. Finally, the possibility of buckle requires a manufacturer to leave larger clearances between the cover and any moving parts within the cartridge.

Because the cover and the base plate of a tape cartridge are dimensionally the same, the vectorial resultant lines representing a given point's change in position as the cartridge undergoes thermal expansion are likewise the same. The present invention takes advantage of this fact by placing slotted bosses along the vectorial resultants. Optimally, the bosses should be placed in direct line with the corners and as close to the corners as possible. FIG. 2 shows that this is not possible in the case of a magnetic tape cartridge 10. In the interest of practicability, placement of the bosses slightly different from the optimal positioning may be considered a functional equivalent.

Figure 3:
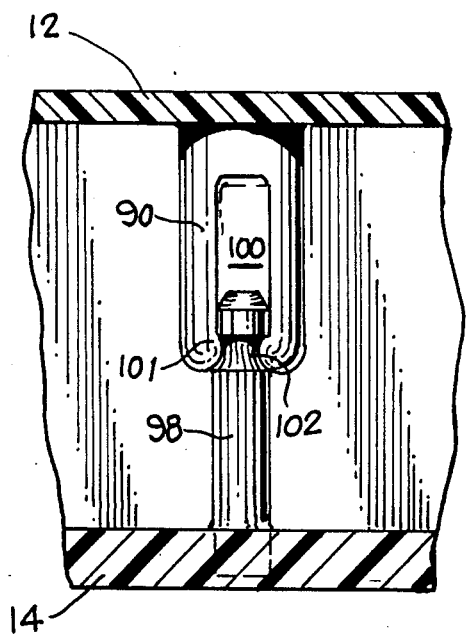
FIG. 3 is an enlarged fragmentary section of the cartridge of FIG. 1 illustrating operation of the slotted boss principle incorporated therein.

FIG. 3 shows the operation of the present invention as viewed from the direction indicated by the arrows along line A—A of FIG. 2. A slot 100 is cut into the boss 90. The slot is machined so as to have a claw-like fitting 101 at the exterior end of the slot. The claw-like fitting 101 clamps onto a furrow 102 in the upper end of the pin 98, but allows the claw-like fitting to slide in one direction over the pin along the slot. Thus, the bosses retain the pins against pulling apart, but allow sliding of the pins laterally along the slots. The claw-like fittings are somewhat flexible and strong pulling apart will ultimately overcome the claw action allowing a cartridge top to be removed. As the cartridge is used it begins to rise in temperature. Because metal will begin to expand before plastic, the base plate 14 expands to a greater degree than does the cover 12. Referring to FIG. 2, the area of the base plate 14 corresponding to the lower portion of line A—A will expand in the direction indicated by the arrows. The slot, being aligned with the vectorial resultant line A—A, permits the pin 98 to move along the resultant line without interferring with the less slowly expanding cover. A similar motion takes place within the slotted boss 84 except the expansion is in the opposite direction of that taking place in slotted boss 90. Likewise, the motion of the pins 94, 96 through the slotted bosses 86, 88 compensates for the difference in thermal expansion along the vectorial resultant line B—B.

The exemplary cartridge fixes the slotted bosses into the cover and the pins into the base plate. While this construction may have practical advantages in assembling the cartridge, functionally there is no reason why the bosses cannot be fixed to the base plate and the pins to the cover. Nor is there any reason why the base plate and the cover cannot be of different geometrical shapes. For example, the base plate may be square and the cover may be round. The only problem this adds is that of aligning the slots so that all pin motion takes place within the slots even though the base plate is expanding in directions different from the cover.

I claim:

1. A temperature compensating closure of a box-like container comprising,
   a base made of a material having a first coefficient of thermal expansion,
   a cover having a second coefficient of thermal expansion different from the first coefficient,
   a plurality of pins extending upward from the base at spaced apart positions, motion of said pins occurring as a result of thermal expansion of said closure following resultant lines representing said pin motion, and
   a plurality of slotted bosses extending downwardly from said cover and having means for engaging said pins, slots of said bosses aligned such that during thermal expansion of the closure said motion of the pins occurs within said slots.

2. The closure of claim 1 wherein said means of engaging pins comprises claw-like fittings at lower ends of said slotted bosses, said fittings being inward in relationship to said bosses, said fittings detachably gripping a furrow cut into said pins.

3. The closure of claim 1 wherein said base and said cover have four corners so that the thermal expansion of the base and cover are proportionally similar, said pins located in resultant lines associated with said corners of the base.

4. The closure of claim 1 having side walls joining said base and said lid.

5. A temperature compensated closure of a cartridge or the like comprising,
   a base having four corners, the base made of a material having a first coefficient of thermal expansion which may be expressed by vectorial resultant lines associated with said corners of the base,
   a cover having a second coefficient of thermal expansion different from the first coefficient, the slope of the cover being geometrically similar to the base so that the thermal expansion of the base and cover are proportionally similar,
   a plurality of pins extending upwardly from the base at spaced apart positions along said vectorial lines,
   a plurality of slotted bosses extending downwardly from the cover and having means for engaging said pins, the slots in said bosses aligned in the direction of said resultant lines whereby motion of the pins along said resultant lines occurs within said slots, and
   side walls joining said base and said cover.

6. The closure of claim 5 wherein said means of engaging pins comprises claw-like fittings at ends of the slotted bosses opposite said cover, said claw-like fittings facing inward in relationship to said bosses, said fittings detachably fitted to furrows cut into said pins.

7. The closure of claim 6 wherein said pins have a frustoconical-configurated end opposite said base.

8. A tape transport system and closure comprising,
   a tape supply hub and a tape take-up hub,
   a length of tape having one end portion wound about the supply hub, an opposite end portion wound about the take-up hub, and an intermediate portion extending between the hubs,
   a means for driving said tape wound hubs to transfer tape from one to the other,
   a base plate having a plurality of corners, the base plate made of a material having a first coefficient of thermal expansion which may be expressed by vectorial resultant lines associated with the base,
   a cover made of a material having a second coefficient of thermal expansion, the shape of the cover being geometrically similar to the base plate so that the thermal expansion of the base plate and cover are proportionally similar,
   a plurality of pins extending upwardly from the base plate at spaced apart positions along said vectorial resultant lines, and
   a plurality of slotted bosses extending downwardly from the cover and having means for engaging said pins, the slots in said bosses aligned in the direction of said resultant lines.

9. The apparatus of claim 8 wherein the cover is made of plastic and the base plate is made of metal.

10. The apparatus of claim 8 wherein said means of engaging pins comprises fittings at the ends of the slotted bosses opposite said cover, said fittings being inwardly directed in relationship to said bosses, said fittings detachably fitted to furrows cut into said pins.

* * * * *